(12) United States Patent
Kaisser et al.

(10) Patent No.: US 7,985,008 B2
(45) Date of Patent: Jul. 26, 2011

(54) PLASTIC COMPONENT HAVING VISIBLE PART AND LIGHT SOURCE

(75) Inventors: Michael Kaisser, Trimmis (CH); Ralf Hala, Lindenberg (DE); Werner Kägi, Domat/Ems (CH)

(73) Assignee: EMS-Chemie AG, Domat/EMS (CH)

( * ) Notice: Subject to any disclaimer, the term of this patent is extended or adjusted under 35 U.S.C. 154(b) by 442 days.

(21) Appl. No.: 11/542,636

(22) Filed: Oct. 4, 2006

(65) Prior Publication Data
US 2007/0091614 A1    Apr. 26, 2007

(30) Foreign Application Priority Data
Oct. 4, 2005 (DE) .......................... 10 2005 047 500

(51) Int. Cl.
*F21V 5/00* (2006.01)
(52) U.S. Cl. ...................... 362/328; 362/241; 362/329
(58) Field of Classification Search .................. 362/241, 362/370, 368, 403, 326–329
See application file for complete search history.

(56) References Cited

U.S. PATENT DOCUMENTS

| | | | |
|---|---|---|---|
| 5,684,633 A | 11/1997 | Lutz et al. | |
| 5,788,357 A | 8/1998 | Muth et al. | |
| 6,354,714 B1 | 3/2002 | Rhodes | |
| 7,513,655 B2 * | 4/2009 | Chang | 362/332 |
| 2007/0165395 A1 * | 7/2007 | Yang | 362/97 |

FOREIGN PATENT DOCUMENTS

| | | |
|---|---|---|
| CH | 2004/01563/04 | 9/2004 |
| DE | 31 51 350 | 7/1983 |
| DE | 85 33 229.1 | 11/1985 |
| DE | 197 22 958 | 12/1997 |
| DE | 198 05 771 | 8/1999 |
| DE | 696 04 502 | 5/2000 |
| DE | 199 28 201 | 12/2000 |
| DE | 199 47 752 | 3/2001 |
| DE | 69331711 | 11/2002 |

(Continued)

OTHER PUBLICATIONS

U.S. Appl. No. 60/612,639, filed Sep. 2004, R. Hala.

(Continued)

*Primary Examiner* — John A Ward
(74) *Attorney, Agent, or Firm* — Browdy and Neimark, PLLC

(57) ABSTRACT

The present invention relates to a plastic component having a visible part that is made in one single layer from a plastic molding compound and that comprises a transparent or translucent matrix, and having a light source that comprises one or more lamp elements, situated under the surface of the visible part. The visible part is implemented as essentially opaque in relation to daylight and transparent or translucent in relation to the light emitted by the lamp elements. The visible part also contains admixed effect pigments and defines a surface appearance image which, when the light source is inactive, essentially corresponds to the surface appearance image of the remaining wall of an object in which the plastic component is installed and which, when the light source is active, is essentially determined by the light source activity. The plastic component according to the invention is characterized in that the lamp elements are selected from a group which comprises light-emitting diodes, organic light-emitting diodes, and fiber-optic light systems, the lamp elements at least partially being embedded in the plastic molding compound of the visible part. The manifold uses of this plastic component comprise installation in vehicles, paneling elements, and furniture, as well as in housings of greatly varying devices.

18 Claims, 1 Drawing Sheet

FOREIGN PATENT DOCUMENTS

| | | |
|---|---|---|
| DE | 202004000004 | 6/2004 |
| EP | 0 746 477 | 11/1992 |
| EP | 0 952 388 A2 | 10/1999 |
| EP | 0 994 415 | 4/2000 |
| EP | 1369447 | 12/2003 |
| EP | 1640134 | 3/2006 |
| JP | 11279289 | 10/1999 |
| WO | 97/16812 A1 | 5/1997 |

OTHER PUBLICATIONS

"Kunststoffe Im Automobilbau", VDI Verlag GmbH, Duesseldorf 2005, report on the conference in Mannheim of Mar. 9-10, 2005, Film Technology in Automobile Construction—A comparison, pp. 145-159.

* cited by examiner

PLASTIC COMPONENT HAVING VISIBLE PART AND LIGHT SOURCE

RELATED PATENT APPLICATIONS

This patent application claims priority of the German patent application DE 10 2005 047 500.0 that has been filed on Oct. 4, 2005; the entire content of which is enclosed herein by explicit reference.

TECHNICAL FIELD OF THE INVENTION

The present invention relates, according to the preamble of independent Claim 1, to a plastic component having a visible part that is made in one layer from a plastic molding compound and that comprises a transparent or translucent matrix, and having a light source, which comprises one or more lamp elements, situated under the surface of the visible part. The visible part is implemented as essentially opaque in relation to daylight and transparent or translucent in relation to the light emitted by the lamp elements and contains admixed effect pigments. Thus, the visible part defines a surface appearance image which, when the light source is inactive, corresponds as much as possible to the surface appearance image of the remaining wall of an object in which the plastic component is installed and which, when the light source is active, is essentially determined by the light source activity.

RELATED PRIOR ART

Such light sources, which are only visible in the active state, but otherwise are practically imperceptible, are known from automobile construction, for example, where they are used as door handle illumination which is unobtrusive during the day or as hidden blinkers, for example. The plastic components required for this purpose are preferably produced from plastic molding compounds which may be processed thermoplastically, having at least one visible part, which is typically implemented as a rear-injected film possibly having decorative properties.

The use of light-emitting diodes (LEDs) as a preferred light source is known, for example, in automobile construction from DE 198 05 771 A1 and from DE 197 22 958 A1. Incandescent lamps for illuminating an illuminated field, such as the ground next to the vehicle or for illuminating a switch element, are replaced therein by light-emitting diodes, because these LEDs consume less electrical energy and develop less heat. In addition, the service life of an LED exceeds the service life of a vehicle in general. According to DE 199 28 201 A1, light-emitting diodes may also be combined with optical fibers to illuminate the immediate surroundings of an automobile. According to DE 199 47 752 A1, LEDs are used as indirect illumination of functional elements, such as recessed handles of automobile doors.

The use of light-emitting diodes is also known from technical areas which are not associated with the vehicle sector. Thus, for example, LEDs having a light strength distribution in the surroundings of the optical axis that is adjustable and related to the actual application are known from German Utility Model DE 20 2004 000 004 U1 in connection with lighting for museums, display windows, showcases, and the like. As an alternative to the use of LEDs in home installations, fluorescent tubes are known from German Utility Model DE 85 33 229 U1, which are used as the illumination of partially transparent or transparent door handles.

The use of films in automobile construction has proven itself, but this use is very complex, because until now there has not been a film which would be suitable for all vehicle body areas of an automobile having their extremely differing requirements (cf. VDI-Gesellschaft für Kunststofftechnik B 4270: KUNSTSTOFFE IM AUTOMOBILBAU [PLASTICS IN AUTOMOBILE CONSTRUCTION], VDI Verlag GmbH, Düsseldorf 2005, report on the conference in Mannheim of Mar. 9-10, 2005 "Folientechnik im Automobilbau—ein Vergleich [Film Technology in Automobile Construction—a Comparison]", see pages 145-159).

From DE 693 31 711 T2 (which is a translation of the patent EP 0 746 477 B1) there is known an illumination equipment for controlling the light reflections on reflective surfaces. According to one preferred aspect, this document refers to an illumination equipment as it is utilized on an automobile, for example. This illumination equipment may offer an aesthetically more pleasant form and can handle reflections from incident light more effective than previously known installations. This document discloses an illumination or signaling equipment (e.g., an illumination for a vehicle), which in its switched-off condition is a part of the opaque body of the vehicle, and which in its switched-on condition fulfills the illumination or signaling function.

From DE 696 04 502 T2 (which is a translation of the patent EP 0 858 647 B1) there is further known a multilayered display panel. This display panel comprises a first layer that is at least partially transparent, a second layer from which at least selected areas effect a certain contrast (opacity, color), and a third layer that connects the first and second layers. In addition, the first layer comprises a coating layer with a transparent carrier in which light modifying particles are embedded.

OBJECTS AND SUMMARY OF THE INVENTION

The object of the present invention is to suggest an alternative plastic component, in which a light source is integrated, which fulfills a signal function in the energized state, but is not recognizable as such in the inactive state. Normal lighting is also to be understood as a signal in the broadest physical sense in this case.

This object is achieved by the features comprising a plastic component having a visible part that is made in one single layer from a plastic molding compound and that comprises a transparent or translucent matrix, and having a light source that comprises one or more lamp elements, situated under the surface of the visible part. The visible part is implemented as essentially opaque in relation to daylight and transparent or translucent in relation to the light emitted by the lamp elements. The visible part contains admixed effect pigments and defines a surface appearance image which, when the light source is inactive, essentially corresponds to the surface appearance image of the remaining wall of an object in which the plastic component is installed and which, when the light source is active, is essentially determined by the light source activity. The plastic component according to the invention is characterized in that the lamp elements are selected from a group which comprises light-emitting diodes (LEDs), organic light-emitting diodes (OLEDs), and fiber-optic light systems, the lamp elements at least partially being embedded in the plastic molding compound of the visible part.

Especially preferred refinements of the plastic component according to the present invention and especially preferred uses thereof as well as further features according to the present invention each result from the dependent claims. Fiber-optic light systems comprise optical fibers, which may be fed from outside the plastic component, for example. Light-emitting diodes (LEDs) are especially preferred.

DETAILED DESCRIPTION OF THE INVENTION

Figure 1:
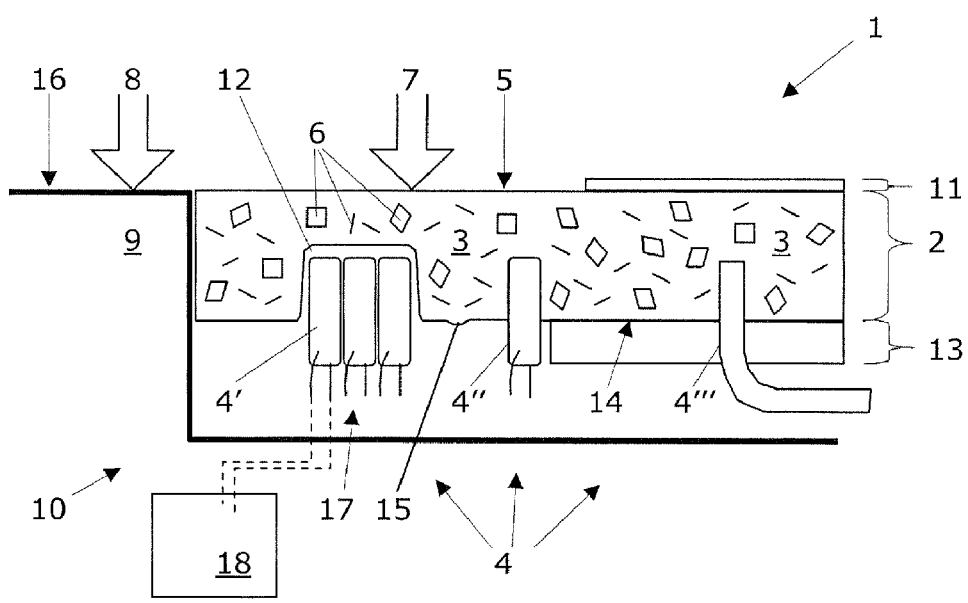
FIG. 1 is a schematic drawing showing a single layer of a transparent or translucent matrix in accordance with the present invention.

FIG. 1 shows a plastic component 1 according to the present invention, having a visible part 2 and a light source 4. The visible part 2 is made in one single layer from a plastic molding compound and comprises a transparent or translucent matrix 3. The light source 4 comprises one or more lamp elements 4',4",4''' which are situated under the surface 5 of the visible part 2. The visible part according to the present invention is implemented as essentially opaque in relation to daylight and transparent or translucent in relation to the light emitted by the lamp elements 4',4",4'''. For this, the visible part 2 contains admixed effect pigments 6 and thus defines a surface appearance image 7 which, when the light source 4 is inactive, essentially corresponds to the surface appearance image 8 of the remaining wall 9 of an object 10 in which the plastic component 1 is installed. When the light source 4 is active, the surface appearance image 7 of the visible part 2 is essentially determined by the light source activity.

The lamp elements 4',4",4''' are selected from a group which comprises light-emitting diodes 4', organic light-emitting diodes 4", and fiber-optic light systems 4'''. Furthermore, the lamp elements 4',4",4''' are at least partially embedded in the plastic molding compound of the visible part 2. In a preferred variant shown in FIG. 1, the light source 4 comprises light-emitting diodes 4' which are situated in an LED module 17 and are activated by a computer 18 or electronic control unit.

Preferably, the visible part 2 of the plastic component 1 is produced through injection molding or through a special method of injection molding. In this case, the visible part 2 has a visible face 5 as well as an injection face 14 facing away therefrom having at least one injection point 15. Preferably, a plastic component 1 having such a visible part 2 is installed in the wall 9 of an object 10 having its visible face 5 flush with the surface 16 of the object's wall 9.

As also shown in FIG. 1, the visible part 2 may additionally have a transparent or translucent surface layer 11 without effect pigments on the visible face 5. The visible part (2) may also comprise on its rear a recess 12 or recesses. The recess 12 or recesses is/are provided for receiving the lamp element or the lamp elements 4',4",4'''.

FIG. 1 further shows that the plastic component 1 may comprise an additional base part 13. This base part 13 may differ in its composition and physical and chemical plastic properties from the visible part 2. The base part 13 may also be injection molded on at least one part of the injection face 14 of the previously solidified visible part 2."

The visible parts of the plastic components according to the present invention offer the advantage over the films known from the prior art, which—particularly to fulfill the high quality requirements of the automobile industry—must be pre-shaped and rear-injected, of simpler production at identical or even better quality. Cracks and strain points or brittle points often occur in deep-drawn films in particular, which impair the quality and the overall impression of the objects produced therewith. Costs may thus be saved and the visual quality of the components may be improved by the present invention, which additionally increases the market chances of the plastic components according to the present invention.

Plastic components of this type are particularly, but not exclusively, used in motor vehicles—for example, as external mirror housings or external door handles. It is frequently required for aesthetic reasons that these plastic components be provided with a surface which corresponds in its color and/or in its visual effect to the surface of a vehicle. If these are surfaces which are to cause a metallic, interference, nacreous, or opalescence effect, especially high requirements are placed on the layer determining the surface. In addition, such components are to have a surface which is especially scratch proof and weather resistant. In addition, such components are also to have especially good mechanical properties, particularly high impact toughness, however.

Preferred plastic components are characterized in that the visible part is produced through injection molding or through a special method of injection molding (e.g., injection compression) and has a visible face as well as an injection face facing away therefrom having at least one injection point. In a first preferred variation, such plastic components comprise a visible part which is equipped on the rear with a recess or recesses for receiving the lamp element or lamp elements.

The visible part may additionally have a transparent or translucent surface layer without effect pigments on the visible face. Effect pigments are also only contained in the visible part (lying underneath here) in this case. This surface layer may be applied directly during the injection molding or also subsequently, e.g., as protective lacquering. This additional surface layer and/or the visible part may alternatively have profiling instead of a constant thickness. This profiling may be implemented on one or both surfaces of the visible part and/or on the surface of the additional surface layer. The areas having the lamp elements underneath may thus be implemented as at least partially relief-like, this relief preferably being emphasized by the active light sources at specific points, for example, at the edges. By situating the relief on the visible face of the visible part and by balancing out the inequalities of this relief using the additional surface layer, the relief effect may be achieved, but the outer surface of the component may nonetheless be produced smooth, so that this plastic component is less susceptible to dirtying and/or is simpler to clean.

Plastic components of a second variation preferably comprise an additional base part, which may differ in the composition and in the physical and chemical plastic properties from the visible part or may comprise an identical polymer, the base part of the plastic component being injection molded on at least one part of the injection face of the previously solidified visible part. The plastic component according to the second preferred variation is thus preferably produced using a two component or multicomponent technique. The application of an additional surface layer to the visible face of the visible part is also possible here, as explained above.

The lamp elements, particularly if they are light-emitting diodes, are preferably at least partially embedded so they are materially bonded and/or have a form fit in the plastic molding compound of the visible part, e.g., extrusion coated or cast in. Furthermore, the plastic component is preferably installed in the wall of an object having its visible face flush with the surface of this wall. The operation of light-emitting diodes in or on objects without connection to the public power supply may be ensured using photovoltaic power generation from sunlight thanks to the low power consumption of the LEDs. In addition or alternatively, batteries may be used for buffering or for the sole power supply. The lamp elements are often first activated below a minimal ambient brightness or in darkness, because the lamp elements in the plastic components according to the present invention first unfold their greatest effect then.

An "object" as defined in the present invention may be an arbitrary vehicle, such as an aircraft, an automobile, a motor scooter, or a ship. Further "objects" comprise signal units, such as signal panels, signal posts, or traffic lights, as well as advertising media, such as outdoor advertising pillars, advertising panels, concealed displays, and the like. Design and/or paneling elements on buildings, roadways, or vehicles are also assigned to the "objects", as well as sport and/or recreation devices, fashion accessories, toys, and/or parts thereof.

The visible surface area (exterior and possibly also interior) of a structure is referred to as a "wall" here. Such structures comprise cabins, housings, as well as housing parts and/or other parts of electrical, electronic, telecommunications, security technology, medical technology, household, and/or body care devices. The surfaces of furniture and packaging parts are also assigned to the "walls" here.

In the plastic component according to the present invention, the light source is preferably implemented as a signaling light source, this signal being selected from a group which comprises blinking lights as well as the display of stationary or moving images. To produce images, according to the present invention, large-area LED modules having a pattern of monochrome (black/white representation) or multicolored (e.g., RGB color representation theoretically having 16.7 million color variations) LEDs are used. The LEDs are then preferably situated in an array to generate an image, each LED corresponding to precisely one pixel of an image to be generated, for example. Such an array may also be referred to as a "LED cluster" and used for displaying video signals and/or video film sequences, as offered by My-tronic GmbH (D-54497 Morbach, Germany). LEDs having especially high light intensity are especially preferred, so that images having good visibility and strong contrast may be generated. Of course, the resolution of the images may be increased or the image may be made smaller at the same resolution by using LEDs having smaller dimensions. LED modules or LED clusters representing images are preferably activated or controlled by a computer or an electronic control unit; the computer may be a portable computer (e.g., a laptop, notebook, or cellular phone), an additional computer installed in an object and/or vehicle, or the on-board computer of the vehicle itself. LED modules may also be implemented as linear arrays having LED situated one behind another and form a light chain.

In connection with the present invention, display indicators and vehicles, warning blinkers, or warning lights in vehicles or fixed devices (such as street signs and the like), blinking signals (such as small colored men in traffic lights, travel direction arrows, and the like), and other optical alarm signals (such as the blinking signal of a burglar alarm system) are considered "blinking lights".

"Images" may be monochrome or multicolored. "Stationary images" include, for example, direction arrows in street signals. "Moving images" include representations having varying color and/or information content, such as colors flowing into one another or pulsing, short films, logos, coats of arms, advertising slogans, moving illuminated scripts, and the like.

In connection with the present invention, "effect pigments" are defined as insoluble particles provided in a polymer matrix. Depending on their type, size, and current concentration or distribution in the plastic component according to the present invention, such effect pigments at least partially reflect, scatter, or absorb the incident electromagnetic waves (in particular in the visible wavelength range, in the UV or IR and/or NIR range) or influence these waves in some way. Therefore, with normal incident daylight, the technology concealed therein and/or thereunder of the plastic components according to the present invention, i.e., the individual light source or the multiple light sources in their particular inactive state, remain concealed or at least veiled to the average eye. Even in daylight, but more clearly and pronounced with daylight reduced or not present, the activated light sources or the linking lights or images generated thereby are visible. NIR-sensitive additives may also be used, for example, in laser welding or laser inscription, for processing plastics, particularly plastic components according to the present invention. Metal particles, aluminum/bronze powder, interference pigments, natural (uncolored) and colored lacquered aluminum glitter, and mineral mica are especially known as effect pigments for use in transparent plastics (see Schäfer/Küsters in Chapter 1.3: Rohstoffe für Masterbatches [Raw Materials for Masterbatches] in FARB-UND ADDITIV-MASTERBATCHES IN DER PRAXIS [COLOR AND ADDITIVE MASTERBATCHES IN PRACTICE], 2003, published by Masterbatch Verband im Verband der Mineralfarbenindustrie e.V., Frankfurt am Main, Germany). These authors also refer to the occurrence of joint lines when extremely fine pearlescent effect pigments are used. Aluminum bronze and gold bronze pigments are available, for example, under the trade name PHOENIX® (ECKERT GmbH & Co. KG, Fürth, Germany). In addition, nacreous pigments and/or nacreous particles are known, which are used for the same purpose in the visible part; in such cases, a dark color of a possible base part is preferred. Metallic pigments, particularly aluminum glitter (compare EP 0 994 415), or nacreous particles are especially preferred. Arbitrary mixtures of these effect particles are also usable. The effect particles are preferably premixed as a color concentrate and dosed into the intake of an injection molding screw as a masterbatch or liquid dispersion.

The plastic molding compound for the visible part preferably comprises at least one transparent polymer which is selected from a group of polymers which comprises aliphatic, cycloaliphatic, and/or aromatic monomers comprising polyamides such as PA MACM 12, PA PACM 12 (cf. also the published patent application JP 11 279 289 in each case); COC (cyclic olefin copolymers); PMMA (polymethyl methacrylate); PMMI (polymethyl methacrylimide); polyesters (diverse homopolyesters, copolyesters, and their blends); PC (polycarbonate) as well as polycarbonate copolymers and their blends; PS (polystyrene) and ABS (acrylonitrile butadiene styrene polymer); SAN (styrene acrylonitrile); ASA (acrylonitrile styrene), and other styrene copolymers and their blends; cellulose esters, such as CA, CP, and CAB; PI (polyimides) and PEI (polyether imides), polysulfones and polyethersulfones (PES, PSU, PPSU), polyphenylenes (PPO, PPE), polyacrylates (PAR), as well as mixtures or blends of these polymers.

Transparent polyamides known per se (which may also be provided in the form of copolyamides) are preferably also used for the molding compounds according to the present invention, which are produced, for example, from monomers selected from the following group:

branched or unbranched aliphatic diamines having 6 through 14 C atoms, such as 1,6-hexamethylenediamine, 2-methyl-1,5-diaminopentane, 2,2,4-trimethylhexamethylenediamine, 1,9-nonamethylenediamine, 1,10-decamethylenediamine, or 1,12-dodecamethylenediamine;

cycloaliphatic diamines having 6 through 22 C atoms, such as 4,4'-diamino-dicyclohexylmethane, 3,3'-dimethyl-4, 4'-diaminodicyclohexylmethane, 4,4'-diaminodicyclohexylpropane, 1,4-diaminocyclohexane, 1,4-bis(aminomethyl)-cyclohexane, 2,6-bis(aminomethyl)-norbornane, or 3-aminomethyl-3,5,5-trimethylcyclohexylamine;

araliphatic diamines having 8 through 22 C atoms, such as m- or p-xylylene diamine or bis(4-aminophenyl)propane;

branched or unbranched aliphatic dicarboxylic acids having 6 through 22 C atoms, such as adipic acid, 2,2,4- and/or 2,4,4-trimethyl adipic acid, azelaic acid, sebacic acid, or 1,12-dodecanedioic acid;

cycloaliphatic dicarboxylic acids having 6 through 22 C atoms, such as cyclo-hexane-1,4-dicarboxylic acid, 4,4'-dicarboxyldicyclohexylmethane, 3,3'-dimethyl-4,4'-dicarboxyldicyclohexylmethane, 4,4'-dicarboxyldicyclohexyl-propane, and 1,4-bis(carboxymethyl) cyclohexane;

araliphatic dicarboxylic acids having 8 through 22 C atoms, such as 4,4'-diphenylmethane dicarboxylic acid;

aromatic dicarboxylic acids having 8 through 22 C atoms, such as isophthalic acid, tributyl isophthalic acid, terephthalic acid, 1,4-, 1,5-, 2,6-, and/or 2,7-naphthaline dicarboxylic acid, diphenic acid, or diphenylether-4,4'-dicarboxylic acid;

dimerized fatty acids having up to 44 C atoms, preferably having 36 C atoms;

lactams having 6 through 12 C atoms and/or the corresponding ω-amino carboxylic acids, such as ε-caprolactam, ε-amino caproic acid, capryl lactam, ω-amino capryl acid, ω-amino undecanoic acid, laurin lactam, or ω-amino dodecanoic acid.

Transparent homopolyamides such as PA MACM 12 und PA PACM 12 as well as the transparent copolyamides PA 12/MACMI and PA MACM/PACM 12 and mixtures or blends thereof are especially preferred. PA MACM/PACM 12, which is known from EP 1 369 447, is very especially preferred. Translucent or even transparent visible parts according to the present invention may be produced from partially crystalline polymers, such as polypropylene, saturated linear polyesters (e.g., PET) and linear aliphatic polyamides (e.g., PA 6, PA 66, mixtures made of PA 6 and PA 66, PA 11, PA 12) under suitable processing and/or cooling conditions and/or by producing suitable layer thicknesses.

Commercially available additives such as softeners, antistatic agents, flame protection agents, fillers, colorants, aromatic inks and/or aromas, stabilizers (e.g., heat and UV stabilizers and/or UV absorbers), and pigments are admixed to the plastic molding compound for the visible part as required. Reinforcement agents, such as glass fibers, glass beads, and mineral additives (particularly nanoscale minerals and/or nanocomposites) also come into consideration, as long as the visual impression of the visible part is not disturbed thereby.

These molding compounds known per se from the prior art are processed to form a plastic component, which comprises at least one visible part and possibly a base part, the plastic molding compound for the visible part comprising a transparent or translucent matrix having admixed effect pigments. The effect pigment particles and/or effect pigments are premixed as a color concentrate, for example, and dosed into the intake of an injection molding screw as a masterbatch or liquid dispersion. As an alternative to this, a corresponding plastic granulate is produced before the injection molding (e.g., through compounding) and this granulate is used on the injection molding machine. The possibly provided based parts may have different physical and/or chemical plastic properties than the visible parts. Visible part(s) and base part(s) may also have an identical polymer matrix, however. The optional base part may be implemented as a mounting frame for the visible part and the print for the LED activation, but also as a housing, which securely encloses the LEDs, the print, possible further installations, such as batteries, cooling elements, and the like.

Essential properties of a visible part comprise the following aspects:

High resistance to ultraviolet radiation, heat, light, moisture, cold, and chemicals; high scratch resistance, high impact toughness, and high gloss.

The effect pigments produce a metallic or interference effect, such as a nacreous effect, if they are distributed in such a matrix.

The more translucent or transparent this matrix, the more clearly the color effect comes out, particularly glittering of the individual effect-particles.

The depth effect of the effect pigments is a function of the transparency of the matrix. However, matrix materials which are only incompletely transparent or translucent may also be used.

Optionally, other (e.g., soluble) colorants may also be admixed to the plastic molding compound for the visible part, so that, for example, any arbitrary transparent color tone tailored to the effect pigments and/or the remaining wall of the object may be achieved.

A suitable method for producing certain variations of the plastic component according to the present invention is disclosed in the Swiss Patent Application of the present applicant of Sep. 24, 2004 having the application number CH 2004 01563/04 and in U.S. Provisional Application of Sep. 24, 2004 having the application No. U.S. 60/612,639. This injection molding method is also disclosed in the European patent application published as EP 1 640 134 A1, which claims priority of the two unpublished applications previously mentioned. This injection molding method is suitable for producing plastic components made of thermoplastically processable plastic molding compounds having at least one visible part and at least one functional part or base part, the plastic molding compound for the visible part comprising a transparent or translucent matrix having admixed effect pigments, and the functional parts or base parts being able to have different physical or chemical plastic properties than the visible parts. This injection molding method comprises the following steps:

a) Injection molding the plastic molding compound of the at least one visible part having a visible face and an injection face facing away therefrom and allowing it to solidify in a first mold having a first cavity, which is defined by a first visible mold half and a first injection mold half;

b) opening the first mold along a partition plane by moving the first visible mold half away from the first injection mold half;

c) closing a second mold using the at least one visible part in a second cavity, which is defined by a receptacle mold half having the visible part and a second injection mold half;

d) injection molding the plastic molding compound of the functional part or base part on at least one part of the injection face of the at least one visible part and allowing it to solidify while undergoing a bond adhesion between visible part and functional part or base part; and e) opening the second mold and removing the component.

If the lamp elements (particularly if they are light-emitting diodes) are not at least partially embedded in the plastic molding compound of the visible parts so they are materially bonded and/or formfitted, in the present invention, if a base part is provided, only a part of the injection face of the visible part is covered by base material. The remaining area must remain free in order to be able to attach the lamp elements or the lamp elements directly to the rear of the visible part.

Thermoplastics which are capable of injection molding from the group of polyamides, polyesters, polycarbonates, polyolefins, as well as thermoplastic elastomers, such as TPU (thermoplastic polyurethane); styrene block copolymers, such as SEBS (styrene ethylene butadiene styrene) or SBS (styrene butadiene styrene); polyester elastomers, polyether elastomers, polyether ester elastomers (TEEE); silicones, which are cross-linked later; ABS (acrylonitrile butadiene styrene polymers), or PVC are suitable for producing the base part. Thermoplastic elastomers are used in particular when the functional part or the base part represents a seal. It is also possible to produce the base part from blends or the recycling products of the above-mentioned polymers or from their blends which are compatible with one another or are made compatible with one another.

Commercially available additives, such as impact toughness modifiers, stabilizers (e.g., UV and heat stabilizers), softeners, colorants, flame protection agents, fillers, reinforcing agents (e.g., glass fibers, carbon fibers, mica, glass beads), and/or pigments are admixed to the plastic molding compound for the base part as required.

Essential properties of a base part comprise the following aspects:
High impact toughness, mechanical rigidity, deformation resistance, and dimensional stability.
Good compatibility with the plastic molding compound of the visible part.
Adequate mechanical strength, outstanding creep resistance, high temperature resistance.
Electrical properties are also to be considered if necessary.

After the material for the visible part has been established, in plastic components having a base part, a material for the base part is preferably selected, in consideration of good bond adhesion, which belongs to the same polymer class or is even identical to the polymer of the visible part. For example, if PA MACM 12 (available from EMS-Chemie AG, Domat/Ems, Switzerland, under the name Grilamid® TR 90) is selected, in consideration of good bond adhesion, PA MACM 12 GF 40 (molding compound made of Grilamid® TR 90 having 40% glass fiber component) is preferably used for the production of the base part, for example, which is obtainable under the trade name Grilamid® TRV-4X9 from EMS-Chemie AG, Domat/Ems, Switzerland.

Alternatively, for the visible part made of Grilamid® TR 90 already cited, a materially different polymer may be used as the plastic molding compound for the base part, namely, for example, a polyamide 12 reinforced with glass beads, i.e., for example, a PA 12 GK 50 (molding compound made of polyamide 12 having 50% glass bead component). Blends in which at least one of the blend components ensures the bond adhesion to the visible part are also suitable as the plastic molding compound for the base part. This blend component is preferably identical to a polymer component of the visible part.

If the visible part and base part are to be entirely or partially incompatible with one another, i.e., they produce a naturally inadequate bond adhesion, their compatibility may be improved using adhesion-mediating modifiers such as polyolefins having reactive groups (cf. EP 0 393 409 B1), which are admixed to the molding compound of the base part and/or the molding compound of the visible part. The visible part is preferably produced having an essentially uniform layer thickness. This may be performed using only one injection nozzle—depending on the geometry of the visible part to be molded—which must always be situated on the side facing away from the visible face, however. The position of the injection point may be selected optimally in regard to uniform filling of the injection molding cavity having favorable flow, so that no irregularities such as joint lines and/or bond seams result. Filling the cavity with favorable flow allows a distribution of the plastic molding compound having the admixed effect particles which is so uniform that this injection point is not recognizable on the finished component. In addition, a homogeneous visual impression and a uniform color depth and covering power may be produced by the essentially uniform thickness of the visible part. This covering power may be elevated by coloring the base material, which at least partially supports the visible part.

The plastic component according to the present invention thus preferably comprises at least one transparent polymer for the visible part which is selected from a group of polymers which comprises polyamides comprising aliphatic, cycloaliphatic, and/or aromatic monomers, cyclic olefin copolymers, polymethyl methacrylate, polymethyl methacrylimide, polyester, polycarbonate and polycarbonate copolymers and their blends, polystyrene and acrylonitrile butadiene styrene polymers, styrene acrylonitrile, acrylonitrile styrene and other styrene copolymers and their blends, cellulose ester, polyimides and polyether imides, polysulfones and polyethersulfones, polyphenylenes, polyacrylates, and mixtures or blends of these polymers.

A plastic component in which the plastic molding compound for the visible part comprises at least one transparent polymer which is selected from a group of polymers which comprises polyamides or copolyamides and/or their mixtures or blends, which are produced from selected monomers of the following group, is especially preferred:
branched or unbranched aliphatic diamines having 6 through 14 C atoms;
cycloaliphatic diamines having 6 through 22 C atoms;
araliphatic diamines having 8 through 22 C atoms;
branched or unbranched aliphatic dicarboxylic acids having 6 through 22 C atoms;
cycloaliphatic dicarboxylic acids having 6 through 22 C atoms;
araliphatic dicarboxylic acids having 8 through 22 C atoms;
aromatic dicarboxylic acids having 8 through 22 C atoms;
dimerized fatty acids having up to 44 C atoms;
lactams having 6 through 12 C atoms and/or corresponding ω-amino carboxylic acids.

A plastic component in which the plastic molding compound for the visible part comprises at least one transparent polymer which is selected from group of polymers which comprises PA MACM 12, PA PACM 12, PA 12/MACMI, and PA MACM/PACM 12 and blends thereof is especially preferred.

The plastic molding compound for the visible part may comprise at least one additive which is selected from the group of UV stabilizers, UV absorbers, and their mixtures. The effect pigments for the visible part are preferably selected from a group which comprises metallic pigments—particularly uncolored or colored aluminum glitter or aluminum bronze or gold bronze pigments—interference pigments, nacreous pigments, mineral mica, and mixtures thereof.

The base part, which is typically used for attaching and supporting the visible part (e.g., in the form of a frame), possibly for supporting a circuit board on which the LEDs are attached and via which these LEDs are supplied with electricity and, if necessary, for dissipating the waste heat of the LEDs, preferably comprises a polymer capable of injection molding, which is selected from a group of polymers which comprises polyamides, polyester, polycarbonates, polyolefins, as well as thermoplastic elastomers, styrene block copolymers, silicones, acrylonitrile butadiene styrene polymers, PVC, and/or their blends or recycling products.

Some preferred examples of products which may be produced or furnished using the plastic molded part according to the present invention are cited here, as a list which is in no way exhaustive:

Cabins (such as telephone cabins as well as passenger cabins for aerial cableways or passenger elevators), housings, as well as housing parts and other parts of electrical, electronic, telecommunications, security technology, medical technology, household, or body care devices. Such devices comprise, for example, cameras, coffee machines, pans and their covers, cellular telephones and their shells; razors; power switches; radios, televisions, and computers as well as their accessories, buttons, and display screens; mixers and hair dryers.

Sport and recreation devices, fashion accessories, toys or parts thereof, such as ski helmets, bicycle and motorcycle helmets, etc.

Design elements, functional and functional design elements which are to be attached to the inside or outside of buildings, roadways, or vehicles (such as bicycles, motorcycles, motor and rail vehicles, ships, and aircraft), such as cover plates, kitchen covers, mirror frames, paneling elements; toilet seats, covers, and/or toilet tank covers for washrooms, light fixtures; decorative trim and caps; wheel covers, acoustic and mirror shells, blinkers in external rearview mirror housings and external door handles, screens, B-column covers for cars, door handles, recessed handles, spoilers, antenna covers, breakdown warning triangles, and other traffic signals or signal panels.

Vehicles surfaces, such as door exteriors, engine hoods and engine covers, baggage compartment covers, trunk covers, fenders, spare tire covers, grooves, radiator grills, hat racks.

Furniture and furniture parts, such as table leaves, cabinet doors; package parts, such as lids of cans and bottles (e.g., for beverages), spray cans or tubes as well as cans or tubes themselves.

Especially preferred uses of the plastic component according to the present invention thus comprise:

Their installation in vehicles, particularly in functional parts, paneling parts, design parts, or functional design parts, above all in automobile construction.

Their installation in cabins, housings, and housing parts and/or other parts of electrical, electronic, telecommunications, security technology, medical technology, household, or body care devices.

The production of sport and/or recreation devices, fashion accessories, toys, and/or parts thereof The production of design, functional, functional design, and/or paneling elements on buildings, roadways, or vehicles.

The production of furniture and/or packaging parts.

Specially situated plastic components are installed, for example, in a side or rear door of a vehicle, particularly a motor vehicle such as a passenger car. The LEDs are then preferably situated in an array to produce an image on the outer door surface, each LED corresponding to precisely one pixel of an image to be generated. In this way, TAXI, a taxi logo, or an insignia of another business, such as a pizza delivery company, may be generated on the door surface to produce an advertisement. If the relevant doors are on an ambulance vehicle, EMERGENCY, a Maltese Cross, a Red Cross, or another image may be generated on the corresponding surfaces. Requests of the police, such as PLEASE PULL OVER, may also be generated on the outer surfaces of car doors or other vehicle body parts.

However, all other vehicle parts are also suitable for generating images, such as car fenders, engine hoods, convertible roofs, sunroofs, trunk lids, and the like; hubcaps in which the plastic molded parts having the associated LEDs are installed are also especially preferred. The image to be generated may be transmitted wirelessly from the onboard computer of an automobile to an RFID tag (radio frequency identification tag), which is situated in the interior of the hubcap and is connected to the print which controls the LEDs. The coordination of the wheel rotation with the image generation may, for example, be used to generate "stationary images" which are not subjected to the wheel rotation.

The plastic components according to the present invention having their integrated lamp elements may also be used, for example, in the dashboard of vehicles to display specific operating states (e.g., control elements in the day/night design) or dangers. In particular, the exclusive appearance of the corresponding display upon the occurrence of the specific operating states or dangers elevates their compliance and, because they are invisible in the normal state, does not result in unnecessary nervousness or distraction of the person steering the vehicle.

The plastic components according to the present invention having their integrated lamp elements may also be used, for example, as temperature or date warning displays in combination with a temperature sensor or a clock on packages for products which spoil easily. Such plastic components may also be used in combination with a temperature sensor as a temperature display on pans or pan covers for cooking sensitive foods.

What is claimed is:

1. A plastic component having a visible part that is made in one single layer from a plastic molding compound and that comprises a transparent or translucent matrix, and having a light source that comprises one or more lamp elements, situated under the surface of the visible part, the visible part being implemented as essentially opaque in relation to daylight and transparent or translucent in relation to the light emitted by the lamp elements, the visible part containing admixed effect pigments and defining a surface appearance image which, when the light source is inactive, essentially corresponds to the surface appearance image of the remaining wall of an object in which the plastic component is installed and which, when the light source is active, is essentially determined by the light source activity, wherein the lamp elements are selected from a group which comprises light-emitting diodes, organic light-emitting diodes, and fiber-optic light systems, the lamp elements at least partially being embedded in the plastic molding compound of the visible part.

2. The plastic component according to claim 1,
wherein the lamp elements are light-emitting diodes.

3. The plastic component according to claim 1,
wherein the visible part is produced through injection molding or through a special method of injection molding and has a visible face as well as an injection face facing away therefrom having at least one injection point.

4. The plastic component according to claim 1,
wherein the visible part additionally has a transparent or translucent surface layer without effect pigments on the visible face.

5. The plastic component according to claim 1,
wherein the visible part comprises on its rear a recess or recesses that is/are provided for receiving the lamp element or the lamp elements.

6. The plastic component according to claim 1,
wherein the plastic component comprises an additional base part, which may differ in its composition and physical and chemical plastic properties from the visible part, the base part of the plastic component being injection molded on at least one part of the injection face of the previously solidified visible part.

7. The plastic component according to claim 6,
wherein the plastic molding compound for the base part comprises a polymer which is identical to a polymer contained in the molding compound for the visible part.

8. The plastic component according claim 1,
wherein the lamp elements are at least partially materially bonded and/or form fitted in the plastic molding compound of the visible part.

9. The plastic component according to claim 3,
wherein the plastic component is installed in the wall of an object having its visible face flush with the surface of the object's wall.

10. The plastic component according to claim 1,
wherein the light source is implemented as a signaling light source, this signal being selected from a group which comprises blinking lights as well as the display of stationary or moving images.

11. The plastic component according to claim 1,
wherein the light source comprises light-emitting diodes which are situated in an LED module and are activated by a computer or electronic control unit.

12. The plastic component according to claim 1,
wherein the plastic molding compound for the visible part comprises at least one transparent polymer which is selected from a group of polymers which comprises aliphatic, cycloaliphatic, and/or aromatic monomers comprising polyamides, cyclic olefin copolymers, polymethyl methacrylate, polymethyl methacrylimide, polyester, polycarbonate as well as polycarbonate copolymers and their blends, polystyrene and acrylonitrile butadiene styrene polymers, styrene acrylonitrile, acrylonitrile styrene and other styrene copolymers and their blends, cellulose ester, polyimides and polyether imides, polysulfones and polyethersulfones, polyphenylenes, polyacrylates, and mixtures or blends of these polymers.

13. The plastic component according to claim 1,
wherein the plastic molding compound for the visible part comprises at least one transparent polymer, which is selected from a group of polymers, which comprises polyamides or copolyamides and/or their mixtures or blends which are produced from monomers selected from the following group:
branched or unbranched aliphatic diamines having 6 trough 14 C atoms;
cycloaliphatic diamines having 6 trough 22 C atoms;
araliphatic diamines having 8 trough 22 C atoms;
branched or unbranched aliphatic dicarboxylic acids having 6 trough 22 C atoms;
cycloaliphatic dicarboxylic acids having 6 through 22 C atoms;
araliphatic dicarboxylic acids having 8 through 22 C atoms;
aromatic dicarboxylic acids having 8 through 22 C atoms;
dimerized fatty acids having up to 44 C atoms;
lactams having 6 through 12 C atoms and/or corresponding ω-amino carboxylic acids.

14. The plastic component according to claim 1,
wherein the plastic molding compound for the visible part comprises at least one transparent polymer which is selected from a group of polymers which comprises PA MACM 12, PA PACM 12, PA 12/MACMI, and PA MACM/PACM 12 as well as mixtures thereof.

15. The plastic component according to claim 12,
wherein the plastic molding compound for the visible part comprises at least one additive which is selected from the group of UV stabilizers, UV absorbers, and their mixtures.

16. The plastic component according to claim 1,
wherein the effect pigments are selected from a group which comprises metallic pigments—particularly uncolored or colored aluminum glitter or aluminum bronze or gold bronze pigments—, interference pigments, nacreous pigments, mineral mica, and mixtures thereof.

17. The plastic component according to claim 6,
wherein the plastic molding compound for the base part comprises at least one polymer which may be injection molded, which is selected from a group of polymers comprising polyamides, polyester, polycarbonates, polyolefins, as well as thermoplastic elastomers, styrene block copolymers, silicones, acrylonitrile butadiene styrene polymers, PVC, as well as their blends or recycling products.

18. A plastic component having a visible part that is made from a plastic molding compound and that comprises a transparent or translucent matrix, and having a light source that comprises one or more lamp elements, situated under the surface of the visible part, said lamp elements are selected from a group which comprises conventional light-emitting diodes, organic light-emitting diodes, and fiber-optic light systems, the visible part containing admixed, incident electromagnetic waves influencing effect pigments,
wherein:
the visible part is made in one single layer;
the effect pigments of the visible part are selected and arranged according to their type, size, and current concentration or distribution in such a way that, when the light source is inactive, the visual effect of the plastic component essentially corresponds to the visual effect of the remaining wall of an object in which the plastic component is installed;
said plastic molding compound of the visible part optionally comprises admixed colorants tailored to the wall of the object;
when the light source is active, the visual effect of the plastic component is essentially determined by the light source activity; and
the lamp elements are at least partially embedded in the plastic molding compound of the visible part.

* * * * *